United States Patent [19]

Elmer et al.

[11] Patent Number: 5,058,164
[45] Date of Patent: Oct. 15, 1991

[54] ENCRYPTION OF STREAMS OF ADDRESSED INFORMATION TO BE USED FOR PROGRAM CODE PROTECTION

[75] Inventors: Thomas I. Elmer, Sunnyvale; Tuan T. Nguyen, Milpitas; Rung-Pan Lin, San Jose, all of Calif.

[73] Assignee: National Semiconductor Corp., Santa Clara, Calif.

[21] Appl. No.: 518,117

[22] Filed: May 3, 1990

[51] Int. Cl.⁵ .............................................. H04L 9/00
[52] U.S. Cl. .............................................. 380/50; 380/4; 380/9
[58] Field of Search ................ 380/4, 6, 9, 28, 50, 380/42, 49

[56] References Cited

U.S. PATENT DOCUMENTS 4,087,626  5/1978  Brader ................................ 380/42
4,157,454  6/1979  Becker .............................. 380/42 X Primary Examiner—Bernarr E. Gregory
Attorney, Agent, or Firm—Steven F. Caserza; Michael Glenn

[57] ABSTRACT

An encryption method is taught which chooses certain bytes of data, stored in a particular on-chip memory, as encryption keys. These chosen bytes are used to encrypt themselves, and all of the remaining data in the above mentioned particular memory. The chosen bytes do not have values specifically assigned for encryption, they are merely chosen, according to a rule, from the body of data to be encrypted. When this technique is implemented, each byte of data, stored in the mentioned memory, is combined (for example using an exclusive NOR gate) with one of the designated encryption key bytes prior to disclosure. The user is not required to provide, program, or safeguard a set of key bytes separately. Additionally, no silicon area is wasted in storing such bytes. An intruder would need certain pieces of the original data in order to decipher the results of this encryption technique. Additionally, this technique degrades gracefully. The keys are chosen such that encrypted data does not have a single common dependency. Thus, in the event a single key is discovered, only a very small portion of the encrypted data will be disclosed.

20 Claims, 4 Drawing Sheets

PRIMARY ELEMENTS OF RUNTIME SECURITY

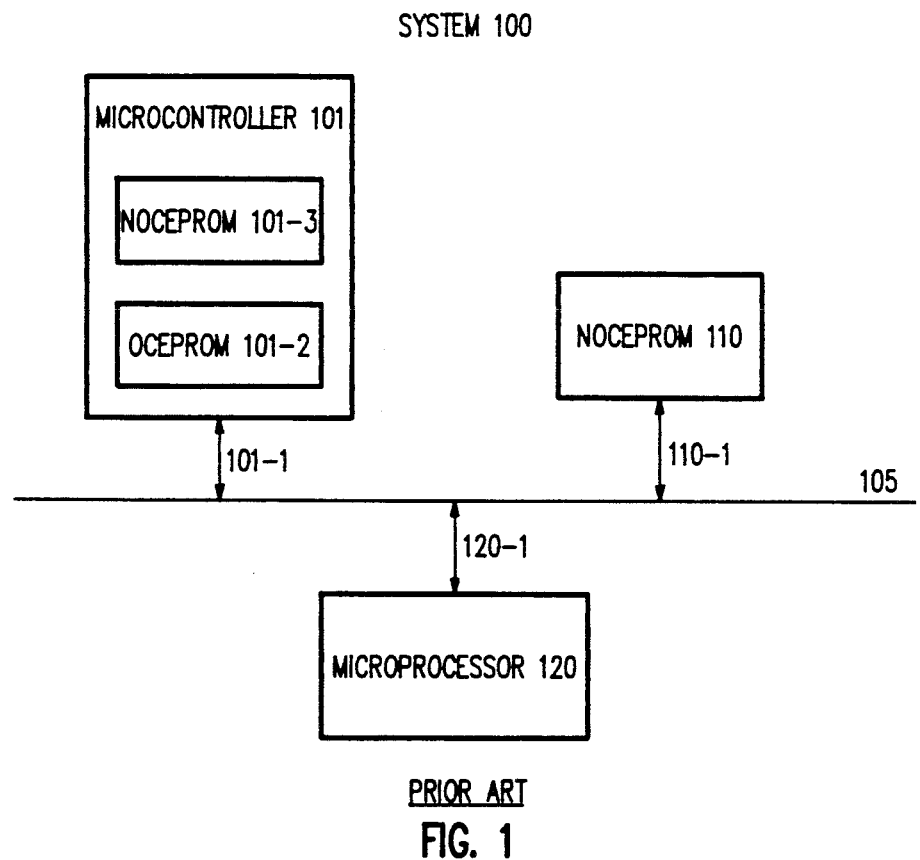
PRIOR ART
FIG. 1
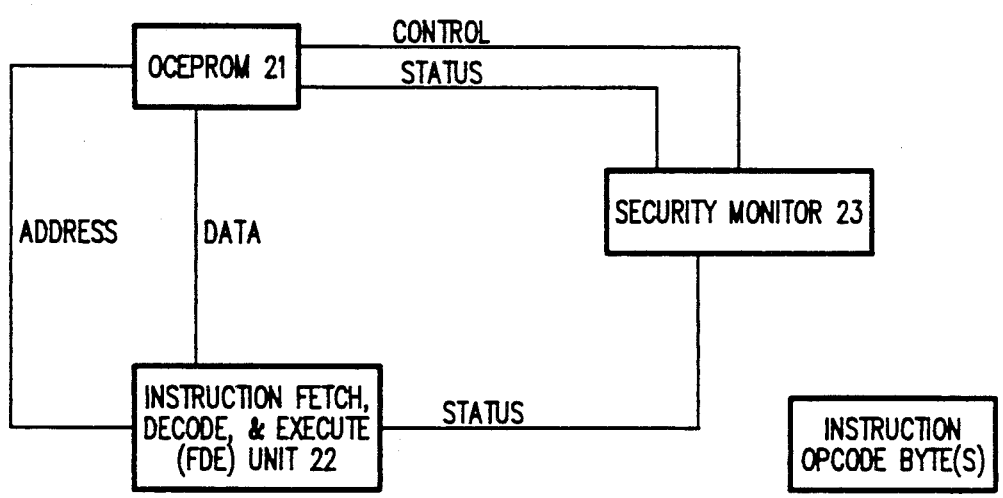
FIG. 2 PRIMARY ELEMENTS OF RUNTIME SECURITY

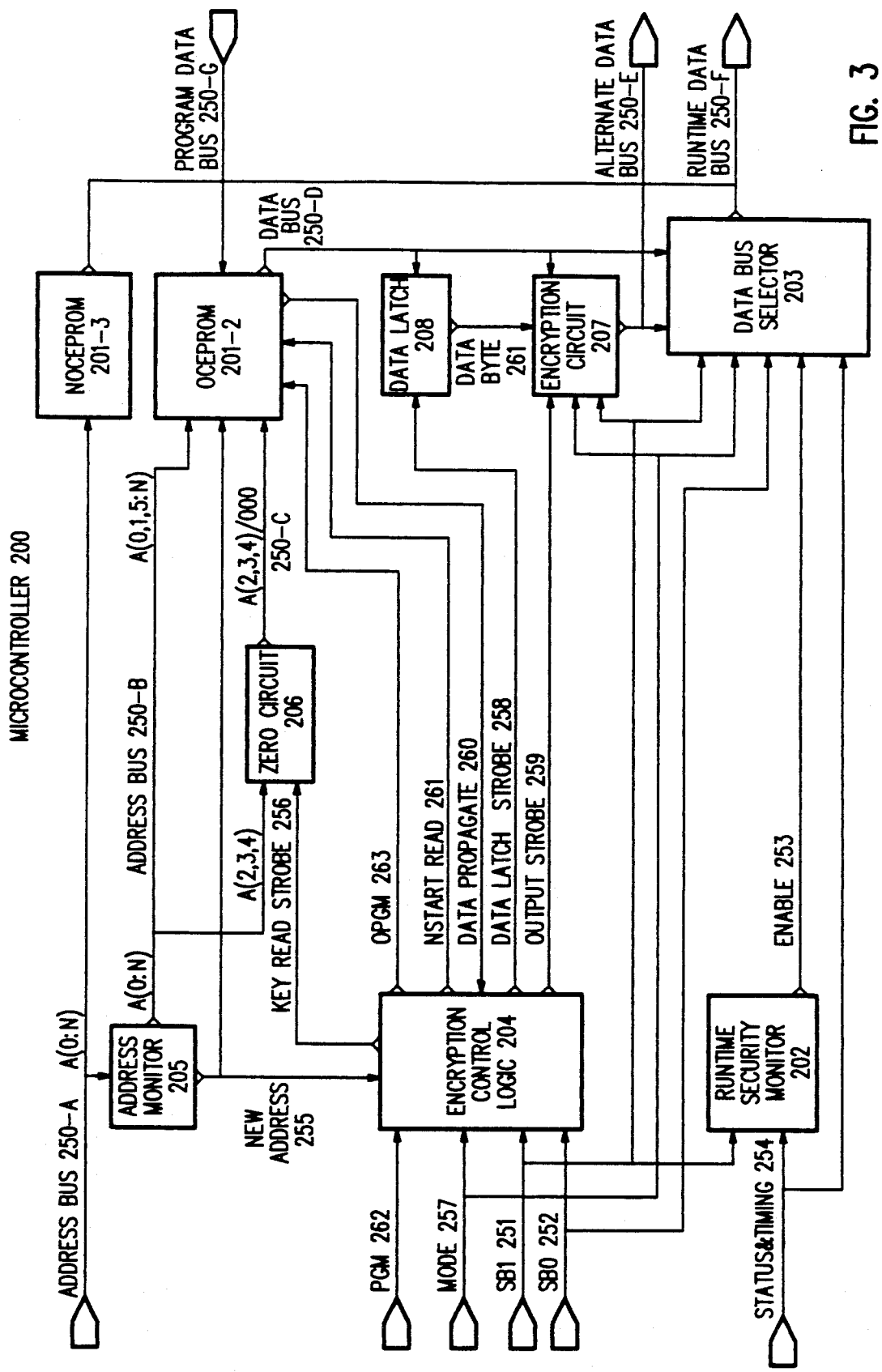

KEY MAPPING FOR MEMORY DUMP ENCRYPTION

ENCRYPTION OF STREAMS OF ADDRESSED INFORMATION TO BE USED FOR PROGRAM CODE PROTECTION

INTRODUCTION

1. Field of the Invention

This invention pertains to protection of proprietary information or algorithms that have been stored in the physical memory of a computer. More specifically, this invention applies to transferring this data from the computer for the purpose of examination or transport, without disclosing the original protected algorithm or information. The technique used to accomplish this is a particular method of encrypting the transferred data. This technique is also applicable in any transport of private or protected information.

2. Background

In the present example, the encryption technique is wholly encapsulated within a memory protection scheme. The goal of this memory protection scheme is to prevent unauthorized disclosure of the contents of a particular computer memory segment, while retaining the ability to perform certain diagnostics on this data. The present embodiment is concerned with so protecting the memory located on an integrated circuit, specifically a microcontroller. In the present embodiment, the memory chosen to be protected is on chip EPROM, and will be called OCEPROM. The other types of memory referred to in this specification are named non "on chip EPROM" memory, or NOCEPROM, for the purpose of differentiation. NOCEPROM includes any memory other than the segment protected by this invention. Memories that belong to the category NOCEPROM may, or may not, be physically located on the integrated circuit that contains OCEPROM, and include for example, the following memories in the category NOCEPROM: on chip RAM, on chip ROM, and any off chip memory.

FIG. 1 is a diagram depicting a typical prior art microprocessor system including system data/address bus 105, microcontroller 101, and memory device 110, and microprocessor 120. Microcontroller 101 is connected to system address/data bus 105 via bus 101-1, and contains OCEPROM 101-2 and NOCEPROM 101-3. Memory device 110 is designated as NOCEPROM according to the above definition, which is connected to system address/data bus 105 via bus 110-1. Microprocessor 120 is connected to system address/data bus via bus 120-1. For purposes of explanation, this specification describes a situation where it is desired to prevent unauthorized disclosure of the contents of OCEPROM 101-2 contained within microcontroller 101, for example, by any code executed from NOCEPROM by microcontroller 101, microprocessor 120 or other processors (not shown).

If the contents of a particular segment of physical microcontroller memory are to be protected from disclosure, present circumstances of microcontroller architecture and use dictate at least two points of consideration. The first point of consideration is how to protect these memory contents at "run time". The second point of consideration is how to protect these memory contents during an alternate mode of operation.

"Run time" is used here to mean that interval during which the microcontroller processor is fetching and executing instructions from memory. These instructions may be used to manipulate pieces of data. The data so associated with an instruction is referred to as the instruction's "operand(s)". It is conceivable that the native instructions of a microcontroller could be used to disclose the contents of a protected segment of physical memory. For example, a data transfer instruction could be used to transfer data from the protected segment to an output port.

The alternate mode of operation presently practiced is generally used for programming, or program verification of, the protected segment and is commonly referred to as one or more of: "memory dump", "ROM Dump", or "EPROM mode". Whatever the name associated with this alternate mode of operation, it is characterized by configuring the microcontroller in some way other than its normal running configuration. The purpose of this alternate mode is to effect disclosure of, or access to, the contents of some physical segment of the microcontroller's total memory. Generally, this alternate configuration does not make use of the microcontroller's on-chip processor capabilities.

While the present discussion is largely concerned with guarding against unauthorized disclosure of information ("read protection"), it is also common to control or prevent alteration of the contents of a protected segment of memory. This is called "write protection". As part of a memory protection mechanism, "write protection" may or may not be practiced in conjunction with measures designed to prevent disclosure of information.

Most prior art memory protection mechanisms for microcontrollers fall into one of two classes, which will be referred to as Class 1 and Class 2 for differentiation. Class 1 mechanisms employ a single element (i.e., computer bit or a fuse of some type) to control access to protected data. If this single element is properly configured, the following measures are generally taken. At "run time", the only instructions that may use data from the protected memory segment as "operand" are instructions stored in, and fetched from, that memory segment. No access to the protected memory segment is allowed in a "memory dump" mode. Class 2 mechanisms employ the same restrictions at "run time" as those used by Class 1. In "memory dump" mode, access to the protected memory segment is generally controlled through the use of a "key". Such a key is usually a binary value. The field width of the key is typically within the range of 128 to 256 bits, corresponding to a range of 16 to 32 8-bit bytes. Field widths of this order provide an enormous number of possible keys from $2^{128}$ to $2^{256}$ and make guessing the single correct key a difficult task. In the prior art, these keys are used in two ways to protect on-chip software.

A first prior art method involves simply using the correct key as permission to access on-chip memory. This means the key is presented to an integrated circuit containing protected memory, and the integrated circuit compares the presented key to a correct key value stored on the integrated circuit. If these two values match, permission is granted to access the on-chip memory. This approach relies simply on the overwhelming number of possible key values—much like a combination lock. There are several disadvantages to this approach: (1) the correct key value must be safeguarded, (2) the correct key value must be stored on the chip, consuming valuable integrated circuit surface area, and (3) if the key is discovered, this security mechanism fails in a catastrophic manner—absolutely no memory protection is retained.

A second prior art method uses the key to encrypt the information stored in on-chip memory before it is disclosed to the external environment. This encryption usually views the protected information as a stream of bytes from the on-chip memory. This stream of bytes is usually repetitively XORed or XNORed with the key bytes until all of the on-chip memory has been encrypted and output. Thus, if there are 32 key bytes, the first key byte is XNORed with the first byte from memory, the second key byte is XNORed with the second byte from memory and so through the 32nd bytes. The 33rd byte from memory is then XNORed with the first key byte and the process begins to repeat itself. There are several disadvantages to this prior art approach: (1) the key must be stored on-chip, consuming valuable integrated circuit surface area, (2) if the key is discovered, the security mechanism fails in a catastrophic manner, and (3) if any unprogrammed bytes of on-chip memory are XNORed with a key byte, the key byte will be known.

Prior Art Memory Protection Method 1 (Class 2)

One prior art method (used, for example, in the INTEL 839XBH, 879XBH, and 87C196KB types of devices) uses two bits located in the chip configuration register CCR) of an integrated circuit to define four levels of protection for on-chip program memory. These bits are referred to as LOC0 and LOC1, and provide the following levels of protection:

TABLE 1

| LOC 1 | LOC 0 | READ PROTECTION | WRITE PROTECTION |
|---|---|---|---|
| 0 | 0 | enabled | enabled |
| 0 | 1 | enabled | disabled |
| 1 | 0 | disabled | enabled |
| 1 | 1 | disabled | disabled |

If read protection is enabled (1) the last five bytes of on-chip memory cannot be used for program storage, (2) on-chip memory can only be read by instructions from on-chip memory, and (3) Non Maskable Interrupt (NMI) causes the integrated circuit to switch to external execution until the next reset. These three measures likely prevent run time disclosure of data stored in the protected on-chip memory.

The value of /EA (external access, external memory) is latched on reset so that the integrated circuit cannot be switched from external to internal execution while running. It is possible that this is done as an aspect of run time security to prevent a split instruction fetch:opcode from external memory, operand from internal, protected memory. This can sometimes be accomplished, on integrated circuits that do not latch /EA, through clever control of this signal.

To perform a memory dump, an on-chip 16 byte security key must be matched. The chip automatically checks for a match between a user supplied key stored at a specified location in external memory and the 16 byte security key stored on the integrated circuit. If the match is successful, the contents of on-chip memory are dumped to external memory. If the match is not successful, the chip puts itself into an endless loop, internal execution.

If write protection is enabled, no further programming is allowed for on-chip memory.

PRIOR ART MEMORY PROTECTION METHOD
2 (Class 2)

This method (used, for example, in the INTEL 87C51, 87C51BH, 87C51FA, 87C51FB, 87C51GA, AND 8752BH types of devices) also employs two bits of EPROM on the integrated circuit to define four levels of protection for on-chip program memory. Referring to these two bits as B1 and B2, the levels of protection shown in Table 2 are provided.

TABLE 2

| B1 | B2 | PROTECTION |
|---|---|---|
| 0 | 0 | (a) externally fetched code cannot access internal program memory |
| | | (b) further programming is disabled |
| | | (c) program verify (memory dump) is disabled |
| 0 | 1 | (a) externally fetched code cannot access internal program memory |
| | | (b) further programming disabled |
| 1 | 0 | reserved for future definition |
| 1 | 1 | none |

The value of /EA is latched on reset whenever on-chip memory is read protected. Under these circumstances, the "present" value of /EA must agree with the latched value, for proper execution. This is likely an aspect of the device's run time memory protection.

Memory dumps are encrypted for all chips that use this method. An on-chip, 32 byte memory array is programmed by the user. This memory array is used to encode program bytes during verification. Each program byte is logically XNORed with one of the 32 key bytes from the array. The key bytes are addressed sequentially. Hence, the first byte of program is XNORed with the first byte of the array. The second byte of program is XNORed with the second byte of the array, and on through the 32nd byte of program. The 33rd byte of program is then XNORed with the first bye of the array. The encryption algorithm repeats in this manner for the entire program.

PRIOR ART MEMORY PROTECTION METHOD
3 (Class 1)

This approach (used, for example, in the INTEL 8751H and 8744H types of devices) uses a single lock bit, hidden on the integrated circuit to control access to on-chip memory. When this bit is programmed: (1) internal program memory cannot be read out, (2) the device cannot be further programmed, and (3) the device cannot execute from external memory. Restricting the device to internal execution is a disadvantage of this method. The lock bit is typically stored in an EPROM cell, and erasing the EPROM restores full functionality to the device.

PRIOR ART MEMORY PROTECTION METHOD
4 (Class 1)

Another prior art technique (used, for example, in the INTEL 8051AHP and 80C51BHP types of devices) limits program memory space, at run time, to 4 K bytes. This space must be configured in one of two possible ways. It is either wholly contained on the chip, or it is entirely external to the chip. Data accesses beyond this 4 K byte boundary can only be done through register Ri using suitable program instructions (such as MOVX-@Ri,A or MOVX A,@Ri). Clearly, prevention of combined internal/external execution reduces the flexibility of this scheme in system applications.

The program verification test mode, referred to in this document as "ROM dump" or "EPROM mode", is simply eliminated from these devices.

Prior Art Memory Protection Method 5 (Class 2)

Certain prior art devices (such as the INTEL 87C51FA and 83C51FB devices) use a single lock bit to control access to on-chip memory. If this bit is left unprogrammed, no protection is provided. If this bit is programmed: (1) /EA will be latched on reset to prevent the device from being switched from external to internal execution while running, and (2) MOVC instructions (used to move program code bytes) executed from external memory are not allowed to fetch code bytes from internal memory.

Additionally, a 32 byte encryption array is used to encode memory dump output as explained in prior art method 2, above. This array is always mapped over memory dump output. If this array is left unprogrammed, the memory data is unaffected. If it is programmed by a user, the ROM data will be encoded.

Prior Art Memory Protection Method 6 (Class 2)

Another prior art technique (used, for example in the INTEL 8398 device) uses a single lock bit stored in a memory cell concealed on the integrated circuit to control access to on-chip program memory. If this bit is programmed, the on-chip memory cannot be read by a program executing from external memory. To perform a memory dump, a 16 byte on-chip key must be matched. In memory dump mode, the key is automatically read from external memory by the integrated circuit. If the key read from external memory matches the on-chip key, memory dump proceeds. If it does not match, memory dump is aborted.

Prior Art Memory Protection Method 7

U.S. Pat. No. 4,698,617 describes a variation of an encryption technique in which the key used to encrypt data changes as different data bytes are read. The '617 patent describes the use of a pseudorandom counter to provide the encryption key, starting its count from a known value. A corresponding pseudorandom counter, starting its count from the same known value, is used in a receiving integrated circuit to decrypt the encrypted data. The '617 patent also shows an example of an encryption technique in which the encryption key is, quite simply, the address of the data desired to be read.

These are disadvantages with the implementations of the '617 patent represented in its FIGS. 1 and 4. Refer first to FIG. 4, where the address is used to encrypt ROM output. One of the two operands for the encoding circuit is easily known—the address. Since the encoding is likely XOR/XNOR based (FIGS. 5a and 5b) we must only determine the fixed mapping of address bits to ROM output bits in order to decipher the transmitted stream of bytes. ROMs generally require some fixed interval to evaluate, measured from the last address change. Call this interval $T_e$. During $T_e$ ROMs usually hold a constant value output, $V_o$ Note that there is no output strobe for the encoding circuit of FIG. 4, so that its output changes are relatively immediate with respect to changes on bus 10 or bus 7. To determine the mapping we simply apply appropriate address patterns on bus 10, with periodicity less than $T_e$, and observe the effect on $V_o$ at bus 8.

The representation of FIG. 1 of the '617 patent is somewhat more robust. Since neither encryption operand is known, we must simultaneously observe the effect on an unknown operand and unknown mapping on $V_o$. However, since the design allows us to control the ROM Enable lead, we may be able to determine the net effect. This may be done in several ways. First, we may hold a constant, active value on lead 11 while changing the address with periodicity greater than $T_e$. This allows us to observe the effect of a single encryption key on several different data bytes.

Second, we may hold the address constant and toggle lead 11 with periodicity greater than $T_e$. This allows us to determine the effect of each encryption key on several (or all) data bytes.

Third, we may hold the address constant and toggle lead 11 with periodicity less than $T_e$. This allows us to determine the effect of each key byte on constant value $V_o$.

While none of these measures are likely to directly reveal the encryption mapping or the protected data, they do reveal a significant amount of information, usable to that end.

There are severe disadvantages with the teachings of the prior art methods 1 through 6. For example, in an embodiment where a 32 byte key is used to encrypt program data, a significant amount of integrated circuit surface area must be devoted to storing the 32 byte key. Also, each key byte is repeated in the encrypted output pattern every 32 bytes. Thus, each key byte encodes 1/32 of the program. Discovering only one key byte immediately reveals a significant portion of the program sought to be protected from disclosure. Furthermore, if an unprogrammed byte of OCEPROM is encoded with one of the key bytes, that key byte will become known. This might occur when the protected program does not fully occupy the space available in OCEPROM, and the unprogrammed portions of OCEPROM are output during memory dump. Additionally, the key value must be at all times be safeguarded both on and off the chip. Finally, if the entire key is discovered, the protection mechanism fails in a catastrophic manner—absolutely no memory protection is retained.

SUMMARY

In accordance with one embodiment of this invention, an encryption method chooses certain bytes of data, stored in a particular on-chip memory, as encryption keys. These chosen bytes are used to encrypt themselves, and all of the remaining data in the above mentioned particular memory. The chosen bytes do not have values specially assigned for encryption, they are merely chosen, according to a rule, from the body of data to be encrypted. When this technique is implemented, each byte of data, stored in the mentioned memory, is combined (for example using an exclusive NOR gate) with one of the designated encryption key bytes prior to disclosure. In accordance with this embodiment, an intruder's attempt to read the encryption key bytes is foiled because they are used to encrypt themselves, resulting in an output byte whose bits are each of logic value 1.

There are particular advantages in the use of this technique. The user is not required to provide, program, or safeguard a set of key bytes separately. Additionally, no silicon area is wasted in storing such bytes. An intruder would need certain pieces of the original data in order to decipher the results of this encryption technique. Additionally, this technique degrades gracefully. The keys are chosen such that encrypted data does not have a single common dependency. Thus, in the event a single key is discovered, only a very small portion of the encrypted data will be disclosed.

BRIEF DESCRIPTION OF THE DRAWING

FIG. 1 is a block diagram depicting a typical prior art microprocessor system;

FIG. 2 is a block diagram depicting one embodiment of a run time memory protection scheme constructed in accordance with the teachings of this invention;

FIG. 3 is a block diagram depicting one embodiment of a memory protection scheme constructed in accordance with the teachings of this invention;

DETAILED DESCRIPTION

Figure 4:
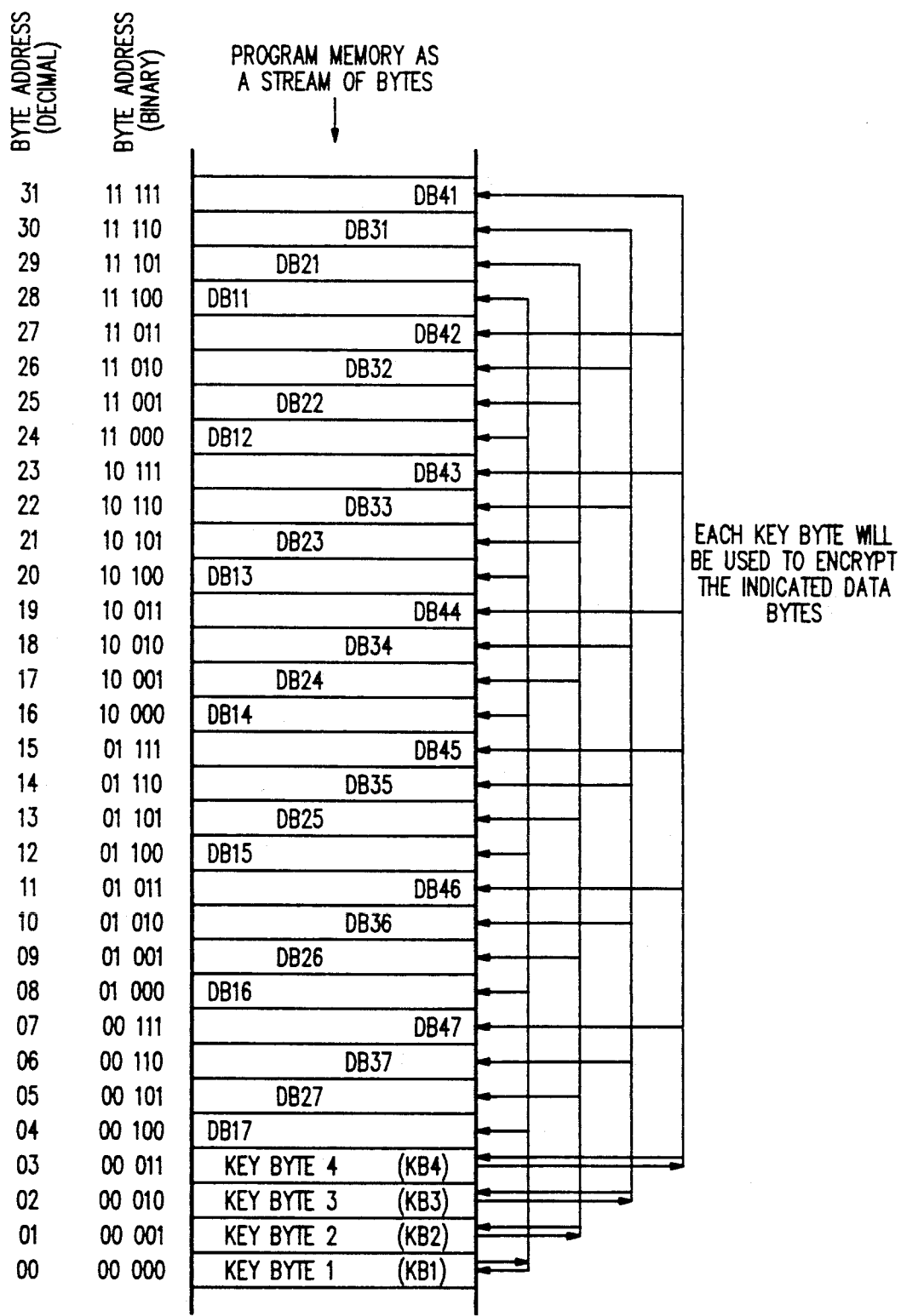
FIG. 4 is a diagram depicting the use of one method of this invention for deterministic isolation of byte faults and depicts how the teachings of this invention associate each key byte with the data bytes it will be used to encrypt.

In accordance with the teachings of this invention, a novel method of data encryption is performed in order to provide a mechanism for protecting the contents of memory. This is particularly well suited for use in a microcontroller, and the following discussion of the encryption structures and techniques of this invention are directed to its application to a microcontroller. However, it is to be understood that the encryption structures and techniques of this invention are suitable for use in memory systems other than microcontrollers, microprocessors, or processors of any scale, and in data transmission in other than memory devices.

We define the segment of memory presently called OCEPROM to be a physical part of a microcontroller.

One embodiment of a run time memory protection scheme of this invention has four primary elements, as shown in FIG. 2.

The instruction opcode is fetched from OCEPROM 21 by Fetch, Decode, and Execution (FDE) unit 22, and this process is monitored by security monitor 23 The first constraint of our runtime security mechanism is that only one FDE unit may access OCEPROM 21. The microcontroller FDE unit with this privilege is specifically the microcontroller physically containing OCEPROM 21. This constraint eliminates the possibility of runtime Direct Memory Access (DMA) to OCEPROM 21, and rules out other runtime plural access mechanisms. By way of example, if the microcontroller containing OCEPROM 21 were designed into a multiprocessor system, this OCEPROM would be accessible at runtime only by the specific microcontroller in which it is contained. In an alternative embodiment, plural execution access is provided to protected memory segments, for example by a plurality of processors or controllers, such as a microprocessor and a DMA controller. In one such embodiment, a plurality of security monitors are used, one for each device capable of execution access to the protected memory. In an alternative embodiment, a single security monitor is used which is more sophisticated and which is able to account for the fact that there are a plurality of execution possibilites. In this embodiment, for example, the single security monitor will not only consider, in determining whether information from protected memory can be read, the address sought to be accessed, but also the device seeking access.

The following definitions serve to illustrate the read and write privileges associated with one embodiment of this invention. In addition to the following discussion, these privileges are described in Table 3.

We define "DATA" privilege to control "run time" access to OCEPROM. It can be thought of as execution access and is designed to prevent a hostile program from reading the contents of secure OCEPROM as data. If DATA privilege is allowed, instructions fetched and executed from NOCEPROM are allowed to use OCEPROM as a source for operands. If DATA privilege is not allowed, instructions fetched from NOCEPROM are not permitted to use OCEPROM as a source for operands. Instructions fetched and executed from OCEPROM are always allowed to use OCEPROM as a source for operands. In these references to instructions, "fetched and executed", the microcontroller performing the fetch and execution is specifically and microcontroller that physically contains OCEPROM.

We define "WRITE" privilege to control attempts to alter the contents of OCEPROM. If WRITE privilege is allowed, OCEPROM may be altered by the provided programming mechanisms. If WRITE privilege is disallowed, the provided programming mechanisms are disabled and alteration of OCEPROM contents is not permitted.

In one embodiment, a microcontroller manifests more than one mode of operation alternate to the generally understood normal running mode. These modes are intended to accomplish program and/or verification of OCEPROM and may or may not employ the microcontroller's resources for executing instructions. They are, in any case, subject to the enforcement of "DATA" and "WRITE" privilege defined above. For these modes of operation, we define "VERIFY" privilege to determine whether the data contained in OCEPROM may be disclosed on request. Such requests are recognized by specific mechanisms when the microcontroller is in an appropriate mode of operation. If VERIFY is allowed, data disclosed from OCEPROM is an exact representation of its stored value. If VERIFY is disallowed, no data is disclosed from OCEPROM. If only "encrypted VERIFY" is allowed, data disclosed from OCEPROM is an encryption of the actual stored value.

TABLE 3

| Programmable Configuration Bits | | DATA TO OCEPROM FROM NOCEPROM ACCESS | Privileges | | | Functions |
|---|---|---|---|---|---|---|
| BIT SB1 | BIT SB0 | | WRITE | VERIFY | ENCRYPTED VERIFY | |
| 1 | 1 | Y | Y | Y | N | Allow WRITE, unencrypted VERIFY, and allow access |

TABLE 3-continued

| Programmable Configuration Bits | | DATA TO OCEPROM FROM NOCEPROM ACCESS | Privileges | | | Functions |
|---|---|---|---|---|---|---|
| BIT SB1 | BIT SB0 | | WRITE | VERIFY | ENCRYPTED VERIFY | |
| 1 | 0 | Y | N | Y | N | to OCEPROM from NOCEPROM with no security Inhibit WRITE, allow unencrypted VERIFY, and allow access to OCEPROM from NOCEPROM |
| 0 | 1 | N | N | N | Y | Inhibit WRITE, allow encrypted VERIFY only, and deny access to OCEPROM from NOCEPROM |
| 0 | 0 | N | N | N | N | Inhibit WRITE, disable VERIFY, and deny access to OCEPROM from NOCEPROM, thereby providing top level security |

These four levels of security (Table 3) are designed to prevent unauthorized disclosure of data stored in OCE-PROM. Additionally, they prevent unauthorized alteration of this data. In one embodiment of a microcontroller utilizing the teachings of this invention, OCEPROM is located between address C000 hex and FFFF hex, inclusive. These four levels of security control access to all of OCEPROM. Additionally, the chip configuration byte(s) containing security bits SB1 and SB0 are write protected if WRITE privilege is disallowed. The chip configuration bytes are not encrypted, and are readable in the provided alternate modes of operation.

FIG. 3 depicts portions of a microcontroller constructed in accordance with one embodiment of this invention. Microcontroller 200 includes NOCEPROM 201-3 which receives address signals from address bus 250-A, and provides data signals to bus 250-F. Since this is NOCEPROM, no encryption or authorization circuitry is used in conjunction NOCEPROM 201-3.

Microcontroller 200 also includes OCEPROM 201-2 which receives address signals from address bus 250-B and also receives address signals from address bus 250-C. OCEPROM 201-2 also provides data signals to data bus 250-D. Since this is OCEPROM, additional circuitry is used to ensure that access to its contained data is authorized and to encrypt the data provided to bus 250-E or bus 250-F when required. As shown in table 3, programmable configuration bits SB1 and SB0 control operation of on-chip security circuitry. The following describes the operation of the circuits and structures of FIG. 3 with respect to the combinations of configuration bit SB1 and configuration bit SB0 defined in Table 3.

If configuration bits SB1 and SB0 both have logic value 1, no special provisions are enforced to prevent disclosure of the contents of OCEPROM 201-2 in normal running mode. Under these circumstances, data contained within OCEPROM 201-2 can be accessed by presenting an appropriate address value on address bus 250-A. Address monitor 205 provides the address it receives on bus 250-A to bus 250-B, unchanged. If this address value is not identical to the previous address value, address monitor 205 briefly provides a logic 0 pulse on new address lead 255. Encryption control logic 204 detects the logic 1 value of SB1 lead 251 and the logic 1 value of SB0 lead 252 and accordingly provides a logic 0 value on key read strobe lead 256. Zero circuit 206 detects the logic 0 value of key read strobe 256 and accordingly provides the address bits A(2,3,4) it receives from bus 250-B to bits A(2,3,4), respectively, of bus 250-C unchanged. In response to the brief logic 0 pulse on new address lead 255, OCEPROM 201-2 provides data to data bus 250-D, in accordance with the address present on address bus 250-B and 250-C. Run time security monitor 202 senses the logic 1 value of SB1 lead 251 and accordingly provides logic 1 value to enable lead 253. Data bus selector 203 examines mode bus 257 to determine the integrated circuit is presently in normal running mode and in accordance with the logic 1 values present on each of SB1 lead 251, SB0 lead 252, and enable lead 253, provides the data present on data bus 250-D to run time data bus 250-F unchanged, when so directed according to the signal values present on status and timing bus 254.

If configuration bits SB1 and SB0 both have logic value 1, no special provisions are enforced to prevent disclosure of the contents of OCEPROM 201-2 in modes of operation intended primarily for the programming or read out of said contents. These modes of operation are previously described as alternate to the normal running mode. Under these circumstances, data contained within OCEPROM 201-2 can be accessed by presenting an appropriate address value on address bus 250-A. Address monitor 205 provides the address it receives on bus 250-A to bus 250-B unchanged. If this address value is not identical to the previous address value, address monitor 205 briefly provides a logic 0 pulse on new address lead 255. Encryption control logic 204 detects the logic 1 value of SB1 on lead 251 and the logic 1 value of SB0 on lead 252 and accordingly provides a logic 0 value on key read strobe lead 256 and provides a logic 0 value on output strobe lead 259. Zero circuit 206 detects the logic 0 value of key read strobe lead 256 and accordingly provides the address bits A(2,3,4) it receives from bus 250-B to bits A(2,3,4), respectively, of bus 250-C unchanged. In response to the brief logic 0 pulse on new address lead 255, OCEPROM 201-2 provides data to data bus 250-D, in accordance with the address present on address bus 250-B and 250-C. As determined by the signal values present on mode bus 257, the data on data bus 250-D may now be presented to one only of data bus 250-E or data bus 250-F, as follows. Encryption circuit 207 detects the logic 0 value of output strobe 259 and the logic 1 value of configuration bit SB1 lead 251 and, if the signal values on mode bus 257 are appropriate, provides the data from bus 250-D to bus 250-E, unchanged. Run time security monitor 202 detects the logic 1 value of SB1 lead 251 and accordingly provides a logic 1 value to enable lead 253. Data bus selector 203 detects the logic 1 value of each of SB1 lead 251, SB0 lead 252, and enable lead 253, and if the signal values on mode bus 257 are appropriate, provides the data from bus 250-D to bus 250-F unchanged, when so directed according to the signal values present on status and timing bus 254.

If configuration bits SB1 and SB0 both have logic value 1 no special provisions are taken to prevent programming of data to OCEPROM 201-2. Under these circumstances, in an appropriate mode of operation, data may be programmed to OCEPROM 201-2 by presenting an address on address bus 250-A and data on data bus 250-G. Address monitor 205 provides the address it receives on address bus 250-A to bus 250-B unchanged. Encryption control logic 204 senses the logic 1 value of SB1 lead 251 and the logic 1 value of SB0 lead 252 and accordingly provides a logic 0 value on key read strobe lead 256. Zero circuit 206 detects the logic 0 value of key read strobe lead 256 and accordingly provides the address bits A(2,3,4) it receives from bus 250-B to bits A(2,3,4), respectively, of bus 250-C unchanged. After a sufficient address and data stabilization interval, a brief logic 0 pulse is applied to PGM lead 262. This brief logic 0 pulse causes encryption logic 204 to provide a brief logic 0 pulse on OPGM lead 263, in accordance with the logic 1 value of SB1 lead 251 and the logic 1 value of SB0 lead 252. OCEPROM 201-2 senses the brief logic 0 pulse on OPGM lead 263 and accordingly programs the data from bus 250-G to the location within OCEPROM 201-2 corresponding to the address value jointly represented by bus 250-B and bus 250-C.

If configuration bit SB1 has logic value 1 and configuration bit SB0 has logic value 0, no special provisions are enforced to prevent disclosure of the contents of OCEPROM 201-2 in normal running mode. Under these circumstances, data contained within OCEPROM 201-2 can be accessed by presenting an appropriate address value on address bus 250-A. Address monitor 205 provides the address it receives on bus 250-A to bus 250-B, unchanged. If this address value is not identical to the previous address value, address monitor 205 briefly provides a logic 0 pulse on new address lead 255. Encryption control logic 204 detects the logic 1 value of SB1 lead 251 and the logic 0 value of SB0 lead 252 and accordingly provides a logic 0 value on key read strobe lead 256. Zero circuit 206 detects the logic 0 value of key read strobe lead 256 and accordingly provides the address bits A(2,3,4) it receives from bus 250-B to bits A(2,3,4), respectively, of bus 250-C unchanged. In response to the brief logic 0 pulse on new address lead 255, OCEPROM 201-2 provides data to data bus 250-D, in accordance with the address present on address bus 250-B and 250-C. Run time security monitor 202 senses the logic 1 value of SB1 lead 251 and accordingly provides a logic 1 value to enable lead 253. Data bus selector 203 examines mode bus 257 to determine the integrated circuit is presently in normal running mode and in accordance with the logic 1 values present on each of SB1 lead 251 and enable lead 253, and in accordance with the logic 0 value present on SB0 lead 252, provides the data present on data bus 250-D to run time data bus 250-F, unchanged, when so directed according to the signal values present on status and timing bus 254.

If configuration bit SB1 has logic value 1 and configuration bit SB0 had logic value 0, no special provisions are enforced to prevent disclosure of the contents of OCEPROM 201-2 in modes of operation intended primarily for the programming or read out of said contents. These modes of operation have been previously described as alternate to the normal running mode. Under these circumstances, data contained within OCEPROM 201-2 can be accessed by presenting an appropriate address value on address bus 250-A. Address monitor 205 provides the address it receives on bus 250-A to bus 250-B unchanged. If this address value is not identical to the previous address value, address monitor 205 briefly provides a logic 0 pulse on new address lead 255. Encryption control logic 204 detects the logic 1 value of SB1 lead 251 and the logic 0 value of SB0 lead 252 and accordingly provides a logic 0 value on key read strobe lead 256 and provides a logic 0 value on output strobe lead 259. Zero circuit 206 detects the logic 0 value of key read strobe lead 256 and accordingly provides the address bits A(2,3,4) it receives from bus 250-B to bits A(2,3,4), respectively, of bus 250-C unchanged. In response to the brief logic 0 pulse on new address lead 255, OCEPROM 201-2 provides data to data bus 250-D, in accordance with the address present on address bus 250-B and 250-C. As determined by the signal values present on mode bus 257, the data on data bus 250-D may now be presented to one only of data bus 250-E or data bus 250-F, as follows. Encryption circuit 207 detects the logic 0 value of output strobe lead 259 and the logic 1 value of configuration bit SB1 lead 251 and, if the signal values on mode bus 257 are appropriate, provides the data from bus 250-D to bus 250-E, unchanged. Run time security monitor 202 detects the logic 1 value of SB1 lead 251 and accordingly provides a logic 1 value to enable lead 253. Data bus selector 203 detects the logic 1 value of SB1 lead 251, the logic 0 value of SB0 lead 252, and the logic 1 value of enable lead 253, and if the signal values on mode bus 257 are appropriate, provides the data from bus 250-D to bus 250-F, unchanged, when so directed according to the signal values present on status and timing bus 254.

If configuration bit SB1 has logic value 1 and configuration bit SB0 has logic value 0, encryption control logic 204 will not provide a logic 0 pulse on opgm lead 263 regardless of the value on PGM lead 262, effectively preventing the programming of OCEPROM 201-2.

If configuration bit SB1 has logic value 0 and configuration bit SB0 had logic value 1, special provisions are enforced in normal running mode to prevent unauthorized disclosure of the contents of OCEPROM 201-2. In accordance with the logic 0 value of SB1, run time security monitor 202 examines the signal values on status and timing bus 254 in order to record the source of each opcode fetch. If a particular opcode is fetched from OCEPROM 201-2, run time security monitor 202 will provide a logic 1 value on enable lead 253 as soon as that opcode begins execution, thereby allowing data bus selector 203 to transfer operand data from data bus 250-D to bus 250-F as necessary for execution of the opcode. If a particular opcode is fetched from NOCEPROM, run time security monitor 202 will not provide a logic 1 value on enable lead 253 during execution of the opcode, thereby preventing data bus selector 203 from transferring any data from bus 250-D to 250-F. In this way, read access to OCEPROM 201-2 is disallowed for any software executed from NOCEPROM.

If the value of configuration bit SB1 is logic 0 and the value of configuration bit SB0 is logic 1, special provisions are enforced to restrict disclosure of the contents of OCEPROM 201-2 in modes of operation intended primarily for the programming or read out of said contents. These modes of operation have been previously described as alternate to the normal running mode. Under these circumstances, verification of locations within OCEPROM 201-2 is allowed and the contents of such locations are encrypted prior to disclosure. To accomplish verification, an address is presented on address bus 250-A. If this address is not identical to the previous address, address monitor 205 briefly provides a logic value 0 pulse on new address lead 255. This pulse initializes encryption control logic 204 and causes it to produce the following output values: key read strobe lead 256 with logic value 0, data latch strobe lead 258 with logic value 1, output strobe lead 259 with logic value 0, nstart read lead 261 with logic value 1. Address monitor 205 provides the address it receives on bus 250-A to bus 250-B with no change. Since the value of key read strobe 256 is presently logic 0, zero circuit 206 has no effect on address bits A(2,3,4), and presents these bits to bus 250-C unchanged. In response to the logic 0 pulse on new address lead 255, OCEPROM 201-2 produces data to bus 250-D in accordance with the address composed from bus 250-B and bus 250-C. After allowing time for this data to propagate to its destination, OCEPROM 201-2 produces a logic 1 value on data propagate lead 260. This causes encryption control logic 204 to produce logic 0 value on data latch strobe lead 258, which causes the data present on bus 250-D to be latched (held) by data latch 208. Immediately thereafter, encryption control logic 204 produces a logic value 1 on key read strobe lead 256 in order to read an encryption key byte from OCEPROM 201-2. Zero circuit 206 detects the logic value 1 on key read strobe lead 256 and accordingly produces logic value 0 on each of the three bits of address bus 250-C. Immediately thereafter, encryption control logic 204 produces a brief logic 0 pulse on nstart read lead 261. This causes OCEPROM 201-2 to produce logic value 0 on data propagate lead 260, and to produce data to data bus 250-D in accordance with the address composed from bus 250-B and from bus 250-C, which presently has logic value 0. After allowing time for this data to propagate to its destination, and for encryption circuit 207 to encrypt the data stored in data latch 208 and presented on bus 261 with the encryption key value on bus 250-D, OCEPROM 201-2 produces a logic 1 value on data propagate lead 260. Immediately thereafter, encryption control logic 204 produces a logic 1 value on output strobe 259, which causes encryption circuit 207 to produce the encrypted data value on data bus 250-E. If mode bus 257 is of appropriate value, the encrypted data value now on bus 250-E may be made available to run time data bus 250-F via selector 203, when selector 203 is so directed by the signal values on status and timing bus 254. If at any time during the above encryption process the address value on bus 250-A is changed, address monitor 205 will briefly produce a logic 1 pulse on new address lead 255 causing encryption control logic 204 to halt the encryption process and begin anew with the new address value. In this event, no data from the halted encryption process will be made available to bus 250-E, thereby maintaining the intended level of security. If the above encryption process is allowed to run to completion by maintaining a constant address value on bus 250-A for a sufficient period of time, an additional encrypted data byte may be requested by then presenting the appropriate address value on bus 250-A.

If configuration bit SB1 has logic value 0 and configuration bit SB0 has logic value 1, encryption control logic 204 will not provide a logic 0 pulse opgm lead 263 regardless of the value on PGM lead 262, effectively preventing the programming of OCEPROM 201-2

If configuration bit SB1 lead 251 has logic value 0 and configuration bit SB0 lead 252 has logic value 0, special provisions are enforced in normal running mode to prevent unauthorized disclosure of the contents of OCEPROM 201-2. In accordance with the logic 0 value of SB1 lead 251, run time security monitor 202 examines the signal values on status and timing bus 254 in order to record the source of each opcode fetch. If a particular opcode is fetched from OCEPROM 201-2, run time security monitor 202 provides a logic 1 value on enable lead 253 as soon as that opcode begins execution, thereby allowing data bus selector 203 to transfer operand data from data bus 250-D to bus 250-F as necessary for execution of the opcode. If a particular opcode is fetched from NOCEPROM, run time security monitor 202 will not provide a logic 1 value on enable lead 253 during execution of the opcode, thereby preventing data bus selector 203 from transferring any data from bus 250-D to bus 250-F. In this way, read access to OCEPROM 201-2 is disallowed for any software executed from NOCEPROM.

If the value of configuration bit SB1 is logic 0 and the value of configuration bit SB0 is logic 0, verification (read out) of locations within OCEPROM 201-2 is not allowed in modes of operation intended primarily for the programming or read out of said contents. Accordingly, encryption control logic 204 does not produce a logic value 1 on output strobe lead 259 and encryption circuit 207 does not transmit any data from data bus 250-D to data bus 250-E. Accordingly, selector 203 does not make data present on data bus 250-D available to run time data bus 250-F.

If configuration bit SB1 has logic value 0 and configuration bit SB0 has logic value 0, encryption control logic 204 will not provide a logic 0 pulse on OPGM lead 263 regardless of the value on PGM lead 262, effectively preventing the programming of OCEPROM 201-2.

Of interest, an advantage over the prior art is the degree to which the circuits and structures of the embodiment of FIG. 3, necessary for the process of data encryption, are isolated from any potential intruder. As with the prior art, the integrated circuit package and physical dimension of the circuit serve to dramatically increase the level of difficulty involved in circumventing the encryption scheme. In addition to this, only two signals are used by the encryption structures of FIG. 3 that may be readily controlled external to the integrated circuit package. These signals are (1) the address bus 250-A, and (2) the DC power required to operate the encryption circuits. As previously noted, any changes in the value of address bus 250-A cause encryption control logic 204 to reinitialize, effectively halting encryption of the present data byte and beginning anew with the new addess value. Changes in the DC power signal required to operate these circuits will cause them to operate either faster or slower. However, under these circumstances all of the circuits contained within the integrated circuit package will increase or decrease in speed to the same extent. Thus, it is not possible to consistently make encryption control logic 204 operate faster or slower than OCEPROM 201-2. This serves to maintain the integrity of our encryption mechanism. All other signals used to operate the encryption circuits are derived within the integrated circuit package.

Of particular interest, in one embodiment, we have eliminated any externally controllable clock, timing, or synchronization signal that any be used to influence the manner in which encryption is performed. To effect this elimination, we have designed encryption control logic 204 in accordance with the present practices of asynchronous sequential circuit design. Of particular interest in this embodiment the use of signal new address 255 to re-initialize encryption control logic 204, and to cause OCEPROM 201-2 to produce new data on data bus 250-D. Note that signal new address 255 is not an enable signal for OCEPROM 201-2, it merely indicates that a new address value has been presented. Use of this signal in the manner we have chosen prevents any intruder from exercising control over the key value chosen to encrypt the requested data byte. This might previously have been done by changing the externally presented address, just as encryption control logic 204 directed OCEPROM 201-2 to produce an encryption key value. Of additional interest in this embodiment is the use of data propagate lead 260, generated by OCE-PROM 201-2. The data propagate signal indicates that data requested from OCEPROM 201-2 has been provided, and has had sufficient interval to propagate along provided signal paths to its destination. Use of this signal has enabled us to eliminate external dependency on a timing or synchronization signal. Of additional interest in this embodiment, is the use of the signal nstart read (on lead 261), which allows encryption control logic 204 to direct OCEPROM 201-2 to produce an encryption key value. These three signals, used in conjunction, provide a novel means to control the process of encryption within a single integrated circuit package. None of these signals are directly controllable external to the integrated circuit package, and their use together dramatically reduces the vulnerability of this encryption mechanism.

Application of Encrypted Verification

When an integrated circuit constructed in accordance with the teachings of this invention is configured to perform encrypted verify, data requested from OCE-PROM is encrypted before disclosure. The address of the requested data byte is provided by the requestor. In accordance with this invention, the encryption method uses bytes of the user code stored in OCEPROM as an encryption key, thereby not requiring storage and use of a separate encryption key.

To effect encryption of a requested data byte before disclosure, on-chip circuits control the following process. The requested data byte is fetched and stored in a temporary location, the "data register". The address, provided by the requestor, is altered by forcing address bits $A_2$, $A_3$, $A_4$, to zero. These bits are identified by counting from the least significant end of the address field, beginning with address bit $A_0$. The newly formed address is used to fetch another byte from OCEPROM to be used as the "encryption key byte". The encryption key byte is bitwise XNORed with the byte stored in the data register. This means that bit $K_0$ of the encryption key byte is XNORED with bit $D_O$ of the data register, bit $K_1$ of the key bye is XNORED with bit $D_1$ of the data register, etc. The resulting value is then disclosed as the encrypted value of the requested data byte.

An example of one embodiment of this encryption technique is now given with reference to Table 4. Suppose the data byte requested from OCEPROM has address COFF hex, and data value AC hex. The requested data byte is fetched and stored in the data register. The address is then changed to value COE3 hex. The byte located at this address is fetched and bitwise XNORed with the data stored in the data register byte. Suppose the byte at address COE3 hex has value 8B hex. The resulting encrypted value is D8 hex. Of interest, in accordance with this invention, in the encrypted verify mode of operation, key bytes can not be detected by an unauthorized user because each key byte is used to encrypt itself, resulting in an encrypted output of logic 1 for each bit. This is clearly a significant advantage over one prior art method which uses the address data, which is inherently known to a hostile program, as the encryption key.

TABLE 4

|  | Hex | Binary |
|---|---|---|
| Address of Requested Data Byte | COFF | 1100,0000,1111,1111 |
| Actual Data Value | AC | 1010,1100 |
| Encryption Key Address | COE3 | 1100,0000,1110,0011 |
| Encryption Key Data | 8B | 1000,1011 |
| Encrypted Data (XNOR) | D8 | 1101,1000 |

Naturally, any desired manner of selecting information stored in on-chip memory as an encryption key may be used, for example, by forcing a different combination of address bits to selected values, such as all ones, all zeros, or a combination of ones and zeros. Alternatively, a selected set of address bits can be altered by performing a logical or arithmetic operation on them with selected bits contained in the address location to be read. By the same token, any desired manner of encrypting the data utilizing the encryption key may be used, for example, be performing arithmetic and/or logical functions utilizing the data byte and the key byte. Furthermore, such encryption can be provided utilizing all bits or, alternatively, one or more bits can be left unencrypted. If desired, a selection of which bits are encrypted can vary over time for example, depending upon data obtained in the desired data byte and/or the value of the encryption key. Furthermore, in an alternative embodiment, the bits of the key byte are in essence scrambled, by changing their order prior to utilizing them for encrypting the data byte.

Deterministic Fault Isolation

With reference to FIG. 4, we describe how the particular method of encryption we have chosen in one embodiment permits deterministic isolation of bit faults, within the protected memory segment, without disclosing the information contained within that protected segment. FIG. 4 details one embodiment of the pairing of encryption key bytes to data bytes. Encrypted memory output will generally be compared to a "test vector", or trusted stream of encrypted data. Discrepancies in these two data byte streams (inequalities) indicate a fault in either the test vector or the encrypted data dumped from memory. When such discrepancies are detected, and the test vector has been proven correct, we deduce the encrypted data stream is in error. We define a byte fault as a condition wherein one or more bits within the byte are of the wrong binary value—each of these is called a bit fault. Each key byte encodes 7 data bytes and itself. For a particular 32 byte segment we can choose a key byte $KB_1$ and its associated data bytes $DB_{11}$–$DB_{17}$ for discussion. The failure modes demonstrated in a particular byte stream will generally fall into one of the 3 following classes.

1) Single bit error in a data byte from the set of bytes $\{DB_{11} \ldots, DB_{47}\}$ 2) Single bit error in a key byte from the set of bytes $\{KB_1, KB_2, KB_3, KB_4\}$ 3) Double bit error comprising an error of type (1) and an error of type (2) such that the key and data byte are associated by the chosen encryption pattern, and such that the two bits in error have the same relative position within their respective bytes. An example is given on Table 5:

TABLE 5

| eg. | correct values | incorrect values |
|---|---|---|
| $DB_{10}$ | 11111111 | 10111111 |
| $KB_1$ | 00001111 | 01001111 |

The indicated bits constitute a double bit error.

Single bit errors in a data byte (failure mode 1) are detectable simply because they are not equal to their counterparts in the test vector. With a review of the function chosen for the encryption (XNOR), as shown in Table 6, it might at first appear that single bit errors in a key byte are undetectable (since each key byte is used to encrypt itself—the result will ALWAYS be "1").

TABLE 6

| (X) | (Y) | (X) XNOR (Y) |
|---|---|---|
| 0 | 0 | 1 |
| 0 | 1 | 0 |
| 1 | 0 | 0 |
| 1 | 1 | 1 |

However, recall that each key byte also encrypts 7 data bytes. The single key bit error will be represented as a data bit error in each of these 7 data bytes. It is uniquely identified by the fact that each of these 7 data bit errors will have the same relative bit positions within their respective bytes.

The traditional problem with the detection of double bit errors (failure mode 3) in encryption mechanisms that employ XOR/XNOR is that a particular key byte encodes only one data byte. This means that failure mode 3 would be undetectable. With the present encryption scheme, failure mode 3 manifests itself as a single bit error in each of the 6 remaining data bytes associated with the particular failed key byte/bit. As an example, refer to the following comparison of test vector to encrypted memory data.

|  | Correct Data Value Before Encryption | Actual Memory Contents With Double Bit Error |
|---|---|---|
| $DB_{37}$ | 0000 0000 | 0000 0000 |
| $DB_{36}$ | 1111 1111 | 1111 1111 |
| $DB_{35}$ | 0000 0000 | 0000 0000 |
| $DB_{34}$ | 1111 1111 | 1111 1111 |
| $DB_{33}$ | 0000 0000 | 0000 0000 |
| $DB_{32}$ | 1111 1111 | 1111 1111 |
| $DB_{31}$ | 0000 0000 | 0000 0100 |
| $KB_3$ | 0000 0000 | 0000 0100 |

Encrypted Data Stream

-continued

|  | Correct Encrypted Test Vector | Reflecting Above Double Bit Error |
|---|---|---|
| $DB_{37}$ | 1111 1111 | 1111 1011 |
| $DB_{36}$ | 0000 0000 | 0000 0100 |
| $DB_{35}$ | 1111 1111 | 1111 1011 |
| $DB_{34}$ | 0000 0000 | 0000 0100 |
| $DB_{33}$ | 1111 1111 | 1111 1011 |
| $DB_{32}$ | 0000 0000 | 0000 0100 |
| $DB_{31}$ | 1111 1111 | 1111 1111 |
| $KB_3$ | 1111 1111 | 1111 1111 |

The correct encrypted data test vector is compared to the encrypted data stream in order to detect the double bit error.

This approach for ENCRYPTED VERIFICATION allows the protected information to be used as its own ENCRYPTION KEY, thereby not requiring the user to provide, program, or safeguard a separate set of encryption key bytes. It assists deterministic fault isolation, allowing the exact error bit to be found if necessary. The data serves as its own encryption key, so no additional circuitry or integrated circuit surface area is required to hold one or more security keys, or to provide a pseudorandom counter to provide a variety of encryption keys from a starting value. This approach allows the user to keep the encrypted version of their program for verification purposes such as field diagnostics—this is inherently safer than keeping an unencrypted version. This approach "fails gracefully"—if any one of the "key" bytes is discovered, only 8 bytes of protected data will be disclosed. These 8 bytes will be non-adjacent and hence will probably not disclose a complete computer instruction.

Use of the memory protection architecture herein described maintains system design flexibility, as it allows a computer processor to execute from either internal memory (such as found on a microcontroller) or from external memory, without compromising security of the protected memory. Implementation of the specific circuits herein described dramatically reduces the vulnerability of this memory protection architecture, as no externally derived synchronization signal is required for the process of encryption.

Figure 5:
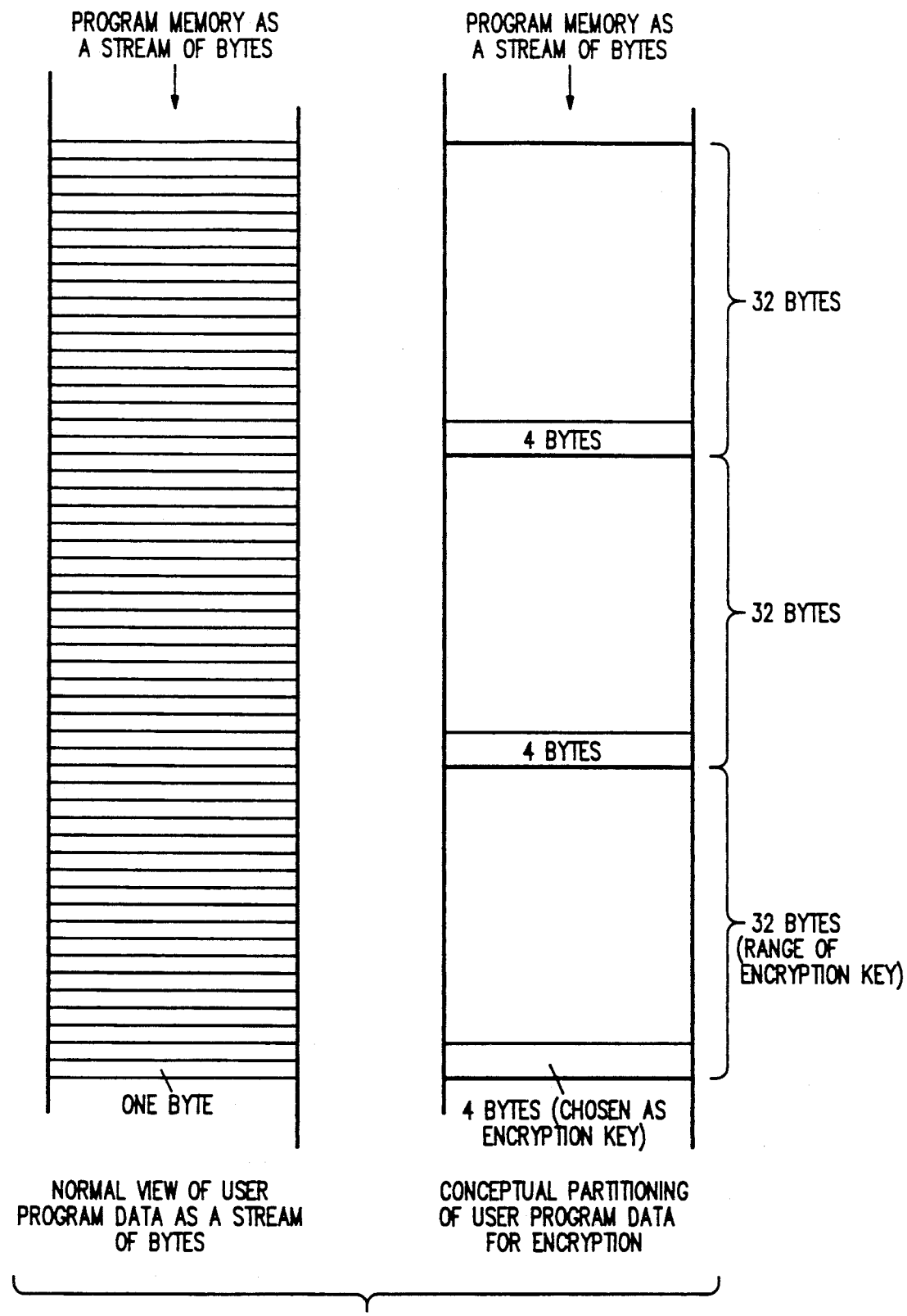
FIG. 5 depicts how the teachings of this invention separate protected code into subsections, each protected with its own separate key.

The particular example given here effectively partitions the protected memory contents into 32 byte segments for encrypted verification. Each of these 32 byte segments will be encrypted by a 4 byte table, located at the "base" of the segment, as depicted in FIG. 5. Each 32 byte section of output data is key independent.

All publications cited in this specification are herein incorporated by reference as if each individual publication or patent application were specifically and individually indicated to be incorporated by reference.

Although the foregoing invention has been described in some detail by way of illustration and example for purposes of clarity and understanding, it will be readily apparent to those of ordinary skill in the art in light of the teachings of this invention that certain changes and modifications may be made thereto without departing from the spirit or scope of the intended claims.

What is claimed is:

1. A method for encrypting data comprising the steps of:

receiving a data address defining a location with a memory means containing data to be encrypted;
providing a key address based upon said data address, said key address defining a location within said memory means the contents of which will serve as an encryption key; and utilizing said encryption key to encrypt said data, thereby providing encrypted data.

2. A method as in claim 1 wherein said step of providing a key address comprises the step of altering said data address to provide said key address.

3. A method as in claim 2 wherein said step of altering said data address to provide said key address comprises the step of setting one or more bits of said data address to predefined values.

4. A method as in claim 2 wherein said step of altering said data address to provide said key address comprises the step of performing a function on one or more bits of said data address, said function selected from the group of functions consisting of logical functions and arithmetic functions.

5. A method as in claim 1 wherein said step of encrypting comprises logically combining one or more bits of said data and said encryption key.

6. A method as in claim 1 wherein said step of encrypting comprises arithmetically combining one or more bits of said data and said encryption key.

7. A data device comprising:
memory means for storing data;
an address bus for receiving a data address defining a location within said memory means;
a data bus for carrying data related to the data stored within said memory means at a location defined by said data address;
means for providing a key address based upon said data address, said key address defining a location within said memory means, the contents of which will serve as an encryption key associated with said address; and
means for encrypting said data with said encryption key in order to provide encrypted data on said data bus.

8. A data device as in claim 7 wherein said data device comprises an integrated circuit and said means for encrypting operates in response to at least one control signal which is not readily available external to said integrated circuit.

9. A data device as in claim 8 wherein said means for encrypting operates asynchronously.

10. A data device as in claim 7 wherein said means for providing a key address comprises means for altering said data address to provide said key address.

11. A data device as in claim 10 wherein said key address is provided by setting one or more bits of said data address to predefined values.

12. A data device as in claim 11 wherein the selection of bits which serve as said one or more bits varies for different data addresses.

13. A data device as in claim 12 wherein the selection of said one or more bits is dependent on the value of one or more bits selected from the bits forming said data and said data address.

14. A data device as in claim 10 wherein said key address is provided by performing a function on one or more bits of said data address, said function selected from the group of functions consisting of logical functions and arithmetic functions.

15. A data device as in claim 14 wherein the selection of bits which serve as said one or more bits is dependent on the value of one or more bits selected from the bits forming said data and said data address.

16. A data device as in claim 15 wherein the selection of said one or more bits is dependent on the value of one or more bits selected from the bits forming said data and said data address.

17. A data device as in claim 7 wherein said means for encrypting comprises means for logically combining one or more bits selected from the bits forming said data and said encryption key.

18. A data device as in claim 17 wherein the selection of said one or more bits is dependent on the value of one or more bits selected from the bits forming said data and said data address.

19. A data device as in claim 7 wherein said means for encrypting comprises means for arithmetically combining one or more bits selected from the bits forming said data and said encryption key.

20. A data device as in claim 19 wherein the selection of said one or more bits is dependent on the value of one or more bits selected from the bits forming said data and said data address.

* * * * *